United States Patent
Nelson

(10) Patent No.: US 10,329,793 B2
(45) Date of Patent: Jun. 25, 2019

(54) DUAL LONGITUDINAL-WELD STEP-IN ANCHOR POST

(71) Applicant: Terry Alan Nelson, Rochester, NY (US)

(72) Inventor: Terry Alan Nelson, Rochester, NY (US)

(*) Notice: Subject to any disclaimer, the term of this patent is extended or adjusted under 35 U.S.C. 154(b) by 293 days.

(21) Appl. No.: 15/442,369

(22) Filed: Feb. 24, 2017

(65) Prior Publication Data

US 2017/0247910 A1 Aug. 31, 2017

Related U.S. Application Data

(60) Provisional application No. 62/389,387, filed on Feb. 25, 2016.

(51) Int. Cl.
*E04H 17/22* (2006.01)
*E04H 17/08* (2006.01)
(Continued)

(52) U.S. Cl.
CPC .............. *E04H 17/08* (2013.01); *A01K 3/00* (2013.01); *E04H 12/2215* (2013.01); *E04H 17/22* (2013.01)

(58) Field of Classification Search
CPC ..... E04H 17/08; E04H 17/22; E04H 12/2215; E04H 17/26; E04H 17/263; E04H 17/261
See application file for complete search history.

(56) References Cited

U.S. PATENT DOCUMENTS

D179,525 S * 1/1957 Porter .......................... 248/513
2,811,333 A 10/1957 Bishop
(Continued)

FOREIGN PATENT DOCUMENTS

DE 102017106803 A1 * 10/2018
FR 2673225 A1 * 8/1992
(Continued)

OTHER PUBLICATIONS

Northern Tool, Lifesafe 4ft Driveway Marker, [online] Retrieved on Jan. 4, 2017, From URL: <http://www.northerntool.com/shop/tools/product_200332787_200332787>.
(Continued)

*Primary Examiner* — Jonathan P Masinick
(74) *Attorney, Agent, or Firm* — Craige Thompson; Thompson Patent Law

(57) ABSTRACT

Apparatus and associated methods relate to a Dual Longitudinal-Weld Step-In Anchor Post (DLWSAP) having a mast or body member extending along an axis, and weld fillets to an anchor member, the weld fillets located on both sides of a mating line of the body and anchor members, the anchor member bent in two places forming two segments parallel, and one segment orthogonal to the body member, the body and anchor members extending toward the ground, chamfered for ground penetration. In an illustrative example, a farmer wishing to reconfigure the fencing in his stockyard due to changes of his livestock populations, may insert a number of DLWSAPs along a perimeter of a new fencing enclosure, by setting the DLWSAPs in place, and stepping on the integrated anchor sections. The farmer may then, for example, hang mesh fencing on the DLWSAPs, to quickly create the new fencing enclosure.

20 Claims, 9 Drawing Sheets

(51) Int. Cl.
*E04H 12/22* (2006.01)
*A01K 3/00* (2006.01)

(56) References Cited

U.S. PATENT DOCUMENTS

| | | | |
|---|---|---|---|
| 2,998,087 A | | 8/1961 | Iddings |
| 3,001,765 A | | 9/1961 | Shobert |
| 4,058,882 A | | 11/1977 | Muckelrath |
| 5,165,663 A | | 11/1992 | Wells |
| 5,375,801 A | * | 12/1994 | Porter ................. E04H 12/2215 248/156 |
| 6,123,311 A | * | 9/2000 | Trinier ................. E04H 12/2215 248/167 |
| 6,247,553 B1 | | 6/2001 | Jones |
| 6,490,823 B1 | * | 12/2002 | Ibarra .................... A01K 97/10 248/512 |
| 6,527,246 B1 | * | 3/2003 | Stinnett .................... F16L 1/06 248/530 |
| 6,575,417 B1 | * | 6/2003 | Krommenakker ............................ A47G 23/0225 248/151 |
| 6,840,507 B2 | | 1/2005 | Brown |
| D554,478 S | * | 11/2007 | Robinson ....................... D8/356 |
| 7,350,480 B1 | | 4/2008 | Hughes |
| 8,096,368 B1 | | 1/2012 | Rider |
| 8,230,944 B2 | | 7/2012 | Thiem |
| 8,549,799 B2 | | 10/2013 | Tate |
| 9,390,640 B1 | * | 7/2016 | Coleman ............. E04H 12/2215 |
| 10,170,221 B2 | * | 1/2019 | McKinley ............... E04H 17/12 |
| 2007/0175700 A1 | | 8/2007 | Moeller |
| 2007/0181320 A1 | | 8/2007 | Mason |
| 2012/0104190 A1 | * | 5/2012 | Parent ................ A47G 29/1216 248/121 |
| 2018/0106062 A1 | * | 4/2018 | Brady ................ E04H 12/2215 |

FOREIGN PATENT DOCUMENTS

| | | |
|---|---|---|
| FR | 2810358 A1 * | 12/2001 |
| FR | 2826039 A1 * | 12/2002 |
| FR | 3014129 B1 * | 9/2016 |

OTHER PUBLICATIONS

Powerfields, 42 Metal Pigtal Post, [online] Retrieved on Jan. 25, 2017, from <http://www.powerfields.com/products-main/portable-fence-posts-menu/item/22-42-metal-pigtail-post>.

* cited by examiner

DUAL LONGITUDINAL-WELD STEP-IN ANCHOR POST

CROSS-REFERENCE TO RELATED APPLICATIONS

This application claims the benefit of U.S. Provisional Application Ser. No. 62/389,387 titled "E-Z Step-In Fence Post," filed by Terry Alan Nelson on Feb. 25, 2016.

This application incorporates the entire contents of the foregoing application(s) herein by reference.

TECHNICAL FIELD

Various embodiments relate generally to portable fence posts.

BACKGROUND

Farmers, ranchers, gardeners, recreational trail maintenance personnel and others, may place posts into the ground to hold various fencing, wire, ropes, reflectors or signage for example. In some instances, the posts may be portable. For instance, a portable post may be a good choice when containing farm or ranch livestock, because of the changing conditions or changing needs for pastures or stockyards. In some scenarios, persons maintaining recreational trails, for example snowmobile trails, may install portable posts to hold safety signage, or to hold a reflector or reflective tape, to mark a trail boundary. The marked trail may promote trail safety and may help prevent property damage. In some scenarios, campers may use a portable post to fence in a pet to prevent loss or to provide protection from wildlife. In some scenarios, a portable post may be a good choice for crowd control for an outdoor attraction such as a car show in a field, where the post may be employed to hold ropes or signage to avoid property damage, for example to mark boundaries around expensive cars to keep show-goers at a safe distance.

SUMMARY

Apparatus and associated methods relate to a Dual Longitudinal-Weld Step-In Anchor Post (DLWSAP) having a mast or body member extending along an axis, and weld fillets to an anchor member, the weld fillets located on both sides of a mating line of the body and anchor members, the anchor member bent in two places forming two segments parallel, and one segment orthogonal to the body member, the body and anchor members extending toward the ground, chamfered for ground penetration. In an illustrative example, a farmer wishing to reconfigure the fencing in his stockyard due to changes of his livestock populations may insert a number of DLWSAPs along a perimeter of a new fencing enclosure by setting the DLWSAPs in place and stepping on the integrated anchor sections. The farmer may then, for example, hang mesh fencing on the DLWSAPs to quickly create the new fencing enclosure.

Various embodiments may achieve one or more advantages. For example, some embodiments may advantageously ease ground penetration into substantially hard soil, for instance, in a dry clay driveway or a gravel parking lot. Some embodiments may advantageously increase service life by avoiding weld failures in abusive situations, for instance, where installers may use high forces to step the post into hard ground, or where livestock may push on the post assembly, such as in a fenced in area in a pasture. In some embodiments, the anchors may be cut serially in manufacturing from single rod stock, where a single angled cut may form a trailing chamfered facet of one anchor, and the same cut may form a leading chamfered facet of the next anchor, advantageously providing material savings and machine time savings.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, a use case of an exemplary Dual Longitudinal-Weld Step-In Anchor Post (DLWSAP) is briefly introduced with reference to FIG. 1. Second, with reference to FIGS. 2-8, the discussion turns to exemplary embodiments that illustrate a number of features of the DLWSAP.

Figure 1:
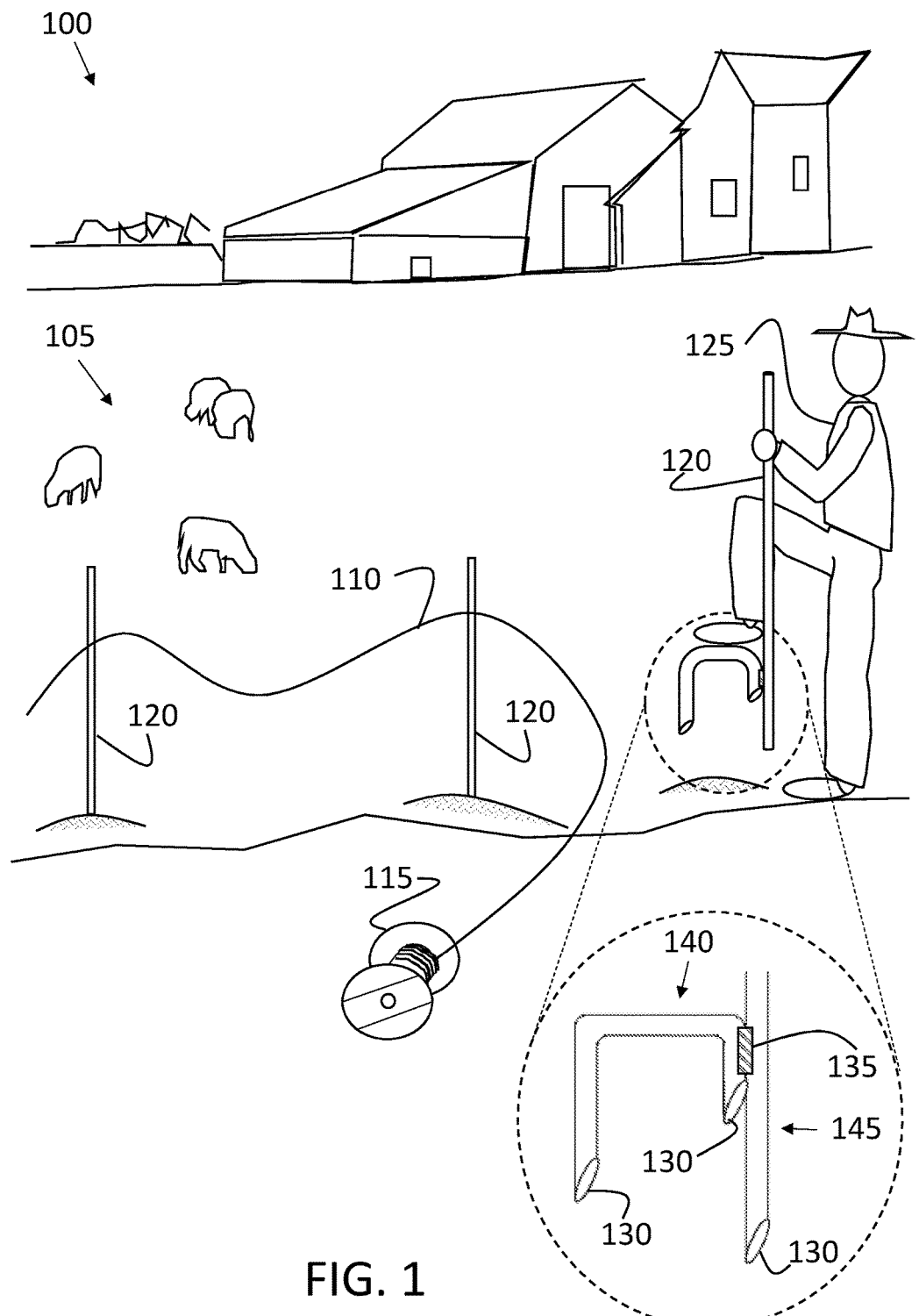
FIG. 1 depicts a prospective view of an exemplary Dual Longitudinal-Weld Step-In Anchor Post (DLWSAP) scenario.

FIG. 1 depicts a prospective view of an exemplary DLWSAP scenario. In the use case scenario 100, livestock 105 are grazing in a field. The livestock 105 are retained by a fence-line 110. The fence-line 110, is sourced by a spool 115. The fence-line 110, is supported by several DLWSAPs 120. The DLWSAPs 120 are inserted into the ground by a farmer 125. The farmer 125 advantageously benefits from chamfered facets 130, on the DLWSAPs 120, which allow hard ground penetration with less effort. The farmer 125 also may advantageously benefit from a double weld 135 on the DLWSAP 120 from the anchor 140 to the body 145, due to the double weld's 135 ability to resist breaking even when the farmer 125 may be required to press the DLWSAPs 120, into hard ground with greater force, for example when installing the DLWSAPs 120 into rocky soil.

Figure 2A:
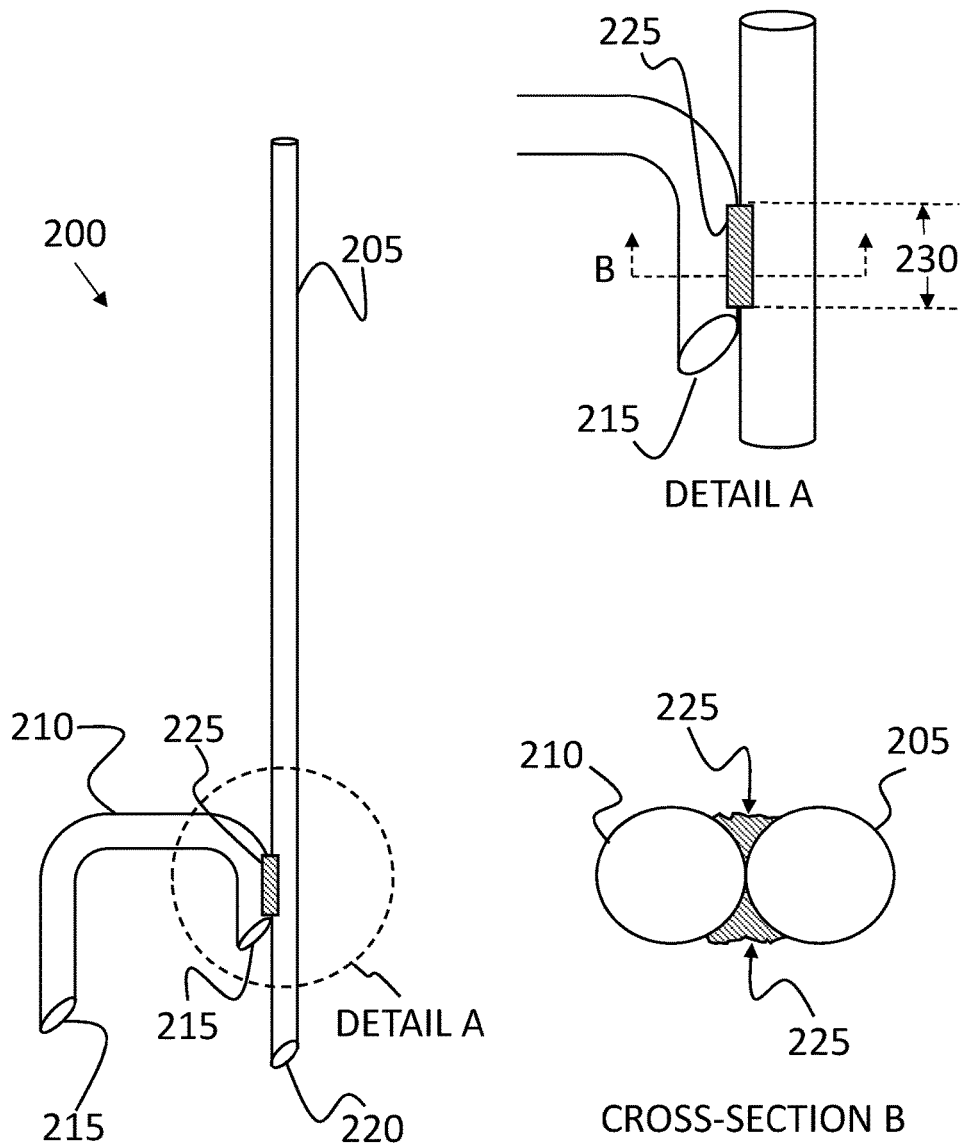
FIG. 2A depicts a side elevation view of an exemplary DLWSAP, and a cross-sectional view of a pair of welds.

FIG. 2A depicts a side elevation view of an exemplary DLWSAP, and a cross-sectional view of a pair of welds. The DLWSAP 200 consists of a mast 205 and an anchor 210. The mast 205, extends along a longitudinal axis, and is weldably connected to the anchor 210. The anchor 210, has an anchor chamfered facet 215 on each end. The mast 205, also has a mast chamfered facet 220 on the lower end. The anchor chamfered facets 215 and the mast chamfered facet 220 may ease the insertion of the DLWSAP into the ground. The mast 205, is connected to the anchor 210 by a weld fillet 225, in two places as shown in cross-section B. As depicted in cross-section B, the weld fillets 225 are on both sides of the mating line between the body 205 and the anchor 210, advantageously reinforcing the attachment. The pair of weld fillets 225 may prevent the anchor 210 from breaking away from the mast 205 when an installer steps with a large force to insert the DLWSAP into hard ground, for example. The pair of weld fillets 225 have a weld fillet length 230. In some examples, the weld fillet length 230, may be less than 5.0", for example, about 0.2", 0.4", 0.6", 0.8", 1.0", 1.2", 1.4", 1.6", 1.8", 2.0", 2.2", 2.4", 2.6", 2.8", 3.0", 3.2", 3.4", 3.6", 3.8", 4.0", 4.2", 4.4", 4.6", or about 4.8", which may advantageously require less labor and materials to manufacture. In some examples the weld fillet length 230, may be about 5.0" or greater, for example, about 5.0", 5.2", 5.4", 5.6", 5.8", 6.0" , 6.2", 6.4", 6.6", 6.8", 7.0", 7.2", 7.4", 7.6", 7.8", 8.0", 8.2", 8.4", 8.6", 8.8", 9.0", 9.2", 9.4", 9.6", 9.8" or about 10.0", which may advantageously provide a more reliable bond of the anchor 210, by providing shear strength, the ability to resist the forces directly in line with the mast 205 axis, by providing tear strength, the ability to resist the forces that tear from the top of the weld fillet 225, down, when inserting the DLWSAP, and to resist the forces that tear from the bottom of the weld fillet 225, up, when extracting the DLWSAP, and by providing rotational strength, the ability to resist the forces that oppose the anchor 210 and the mast 205 from axially rotating around each other, for example, during a collision with another mast 205.

Figure 2B:
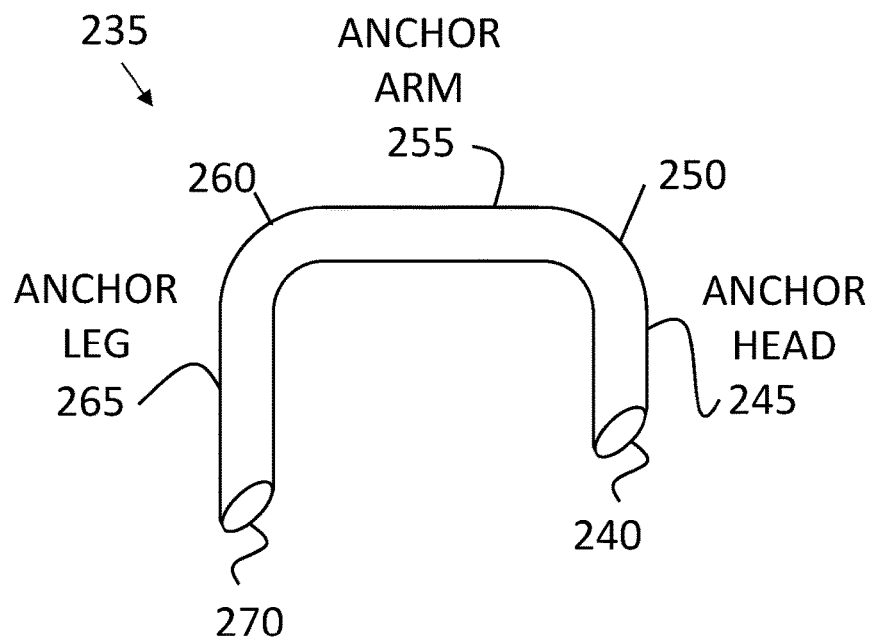
FIG. 2B depicts a side elevation view of an exemplary anchor member of a DLWSAP detailing the anchor portions.

FIG. 2B depicts a side elevation view of an exemplary anchor member of a DLWSAP detailing the anchor portions. The exemplary anchor 235, consists of 3 portions. The anchor 235 begins with a first chamfered facet 240. The first chamfered facet 240 extends to the anchor head 245. The anchor head 245 extends to the first bend 250. The first bend 250, extends to the anchor arm 255 portion. The anchor arm 255 extends to the second bend 260. The second bend 260 extends to the anchor leg 265. The anchor leg 265 ends to the second chamfered facet 270. In an illustrative example, during manufacture the anchor 235 may be cut serially from single rod stock, where a single angled cut may form the trailing chamfered facet 270 of one anchor 235, and the same cut may form a leading chamfered facet 240, of the next anchor 235, advantageously providing material savings and machining time.

Figure 2C:
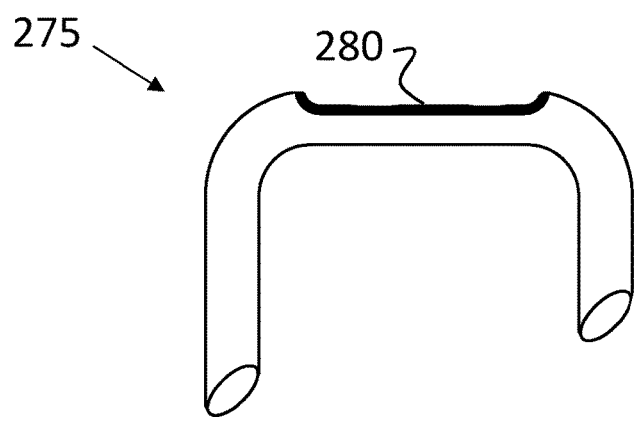
FIG. 2C depicts a side elevation view of an exemplary anchor member of a DLWSAP illustrating a top-flattened tread step landing.

FIG. 2C depicts a side elevation view of an exemplary anchor member of a DLWSAP illustrating a top-flattened tread step landing. The anchor 275, contains a top-flattened tread step landing 280, for a shoe for example. In some embodiments, the top-flattened tread step landing 280 may have a foot contacting portion in a waffle pattern, or other tread pattern, advantageously providing the user with supplemental grip on their footwear. In some embodiments, the top-flattened tread step landing 280 may configure the anchor arm material into a horizontal zig-zag, or into a horizontal serpentine pattern, which may advantageously provide a comfortable landing spot for a foot.

Figure 3:
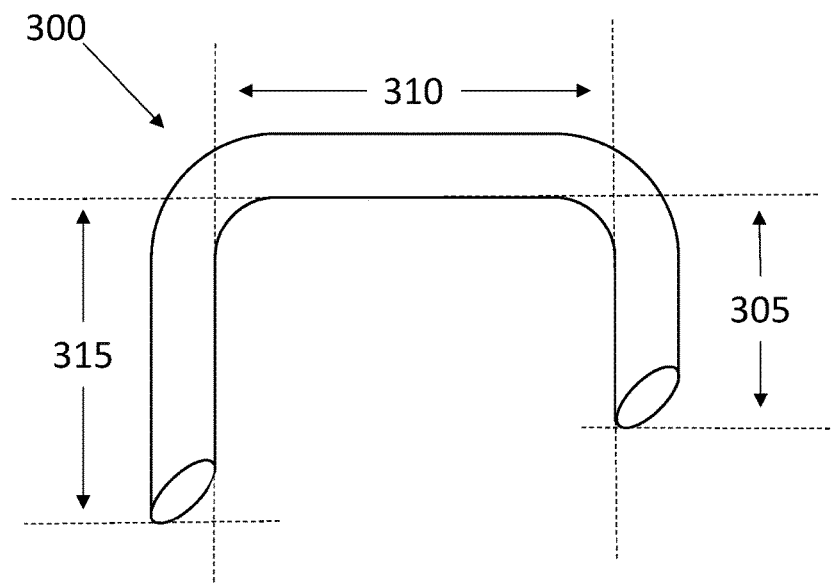
FIG. 3 depicts a side elevation view of an exemplary DLWSAP detailing the anchor section lengths.

FIG. 3 depicts a side elevation view of an exemplary DLWSAP detailing the anchor section lengths. An anchor member 300 consists of an anchor head 305, an anchor arm 310, and an anchor leg 315. In some embodiments, the anchor arm 310 length may be less than 4.0" for example, about 0.2", 0.4", 0.6", 0.8", 1.0", 1.2", 1.4", 1.6", 1.8", 2.0", 2.2", 2.4", 2.6", 2.8", 3.0", 3.2", 3.4", 3.6", or about 3.8", which may advantageously provide a convenient target size for a tool, for example a mallet or a sledgehammer. In some embodiments, the arm length of less than 4.0" may advantageously allow the DLWSAP to be placed or stored in tight spaces. In some embodiments, the anchor arm 310 length may be about 4", which may advantageously provide a convenient step landing size for a shoe or a boot. In some embodiments, the anchor arm 310 length may be 4.0" or greater, for example about 4.0", 4.2", 4.4", 4.6", 4.8", 5.0", 5.2", 5.4", 5.6", 5.8", 6.0", 6.2", 6.4", 6.6", 6.8", 7.0", 7.2", 7.4", 7.6", 7.8", 8.0", 8.2", 8.4", 8.6", 8.8", 9.0", 9.2", 9.4", 9.6", 9.8" or about 10.0", which may advantageously provide a convenient step landing size for a large boot, or for more than one boot for example. In some embodiments, the anchor arm 310 length of greater that 4.0" may provide enough room for two people to stand on the anchor, which may advantageously provide a greater force to insert the DLWSAP. In some embodiments, the anchor leg 315 length may be less than 4.0" for example about 0.2", 0.4", 0.6", 0.8", 1.0", 1.2", 1.4", 1.6", 1.8", 2.0", 2.2", 2.4", 2.6", 2.8", 3.0", 3.2", 3.4", 3.6", or about 3.8", which may advantageously provide positive anchoring characteristics combined with ease of insertion and extraction, due to less anchor 300 material required for insertion into the ground and therefore less ground-holding retention. In some embodiments, the anchor leg 315 length may be 4.0" or greater, for example about 4.0", 4.2", 4.4", 4.6", 4.8", 5.0", 5.2", 5.4", 5.6", 5.8", 6.0", 6.2", 6.4", 6.6", 6.8", 7.0", 7.2", 7.4", 7.6", 7.8", 8.0", 8.2", 8.4", 8.6", 8.8", 9.0", 9.2", 9.4", 9.6", 9.8" or about 10.0", advantageously providing the DLWSAP with greater anchoring characteristics, due to more material inserting into the ground, providing more ground support. In some implementations, a 45° angle single cut operation may form two facets for an anchor and mast.

Figure 4A:
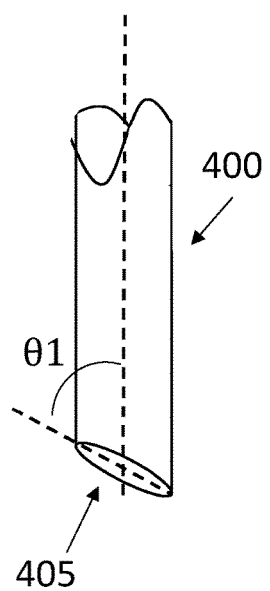
FIGS. 4A, 4B and 4C depict side elevation views of exemplary DLWSAP ground penetrating ends, detailing a chamfer angle.
Figure 4B:
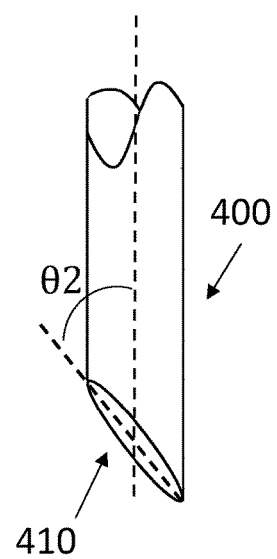
Figure 4C:
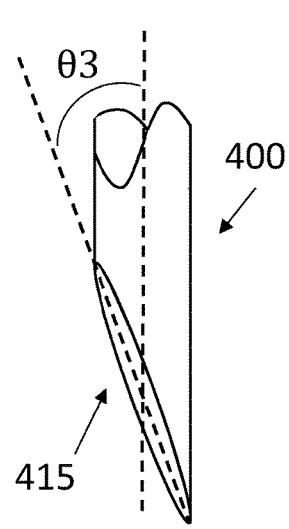

FIGS. 4A, 4B and 4C depict side elevation views of exemplary DLWSAP ground penetrating ends, detailing a chamfer angle. In FIG. 4A, a DLWSAP ground penetrating end 400 is shown terminated with an angled chamfer 405. A chamfer angle θ1 is measured from the longitudinal axis to the angle of the angled chamfer 405. In some embodiments, the chamfer angle θ1 may be more than 45°, for example about 50°, 55°, 60°, 65°, 70°, 75° or about 80°. The chamfer angle θ1 of more than 45° may advantageously provide resistance to tip breakage. In some embodiments, the chamfer angle of more than 45° may advantageously reduce the risk of user injury. In some embodiments, the chamfer angle of more than 45° may advantageously reduce the risk of property damage for instance the user's vehicle may be less likely to be scratched or less likely for upholstery to be ripped.

In FIG. 4B, a DLWSAP ground penetrating end 400 is shown terminated with an angled chamfer 410. In some embodiments, the chamfer angle θ2 may be about 45°. A chamfer angle θ2 is measured from the longitudinal axis to the angle of the angled chamfer 410. The chamfer angle θ2 of about 45° may advantageously provide good ground penetration combined with tip breakage resistance and avoidance of sharp tip dangers such as user injury, or property damage.

In FIG. 4C, a DLWSAP ground penetrating end 400 is shown terminated with an angled chamfer 415. A chamfer angle θ3 is measured from the longitudinal axis to the angle of the angled chamfer 415. In some embodiments, the chamfer angle θ3 may be less than 45°, for example about 10°, 15°, 20°, 25°, 30°, 35° or about 40°. The chamfer angle θ3 of less than 45° may advantageously provide an aggressive penetrating tip for high ground penetration capability. In some embodiments, the chamfer angle of less than 45° may be used advantageously in very hard soils such as packed clay in a construction site or in a gravel parking lot.

Figure 5A:
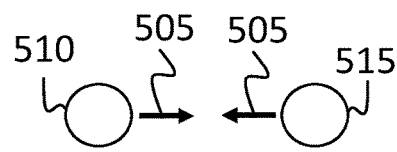
FIGS. 5A, 5B, 5C, 5D, 5E and 5F depict plan views of exemplary DLWSAPs detailing the relative orientation of the chamfered facet.

FIGS. 5A, 5B, 5C, 5D, 5E and 5F depict plan views of exemplary DLWSAPs detailing the relative orientation of the chamfered facet. A chamfer face arrow 505 shows the direction of the facing side of the chamfered facet, for example in FIG. 4B reference 410. In FIG. 5A, the chamfered facets (FIG. 4B reference 410), of the anchor 510 and the body 515, face each other. The chamfered facets in this orientation may advantageously prevent the DLWSAP from moving out of position as it is inserted into the ground, and may compact the soil toward the inside of the DLWSAP, which may advantageously provide a more secure attachment to the ground.

Figure 5B:
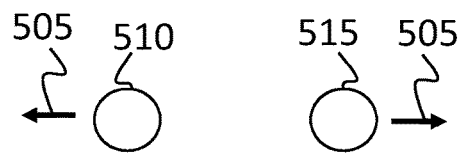

In FIG. 5B, the chamfered facets (FIG. 4B reference 410), of the anchor 510 and the body 515, face away from each other. The chamfered facets in this orientation may advantageously prevent the DLWSAP from moving out of position as it is inserted into the ground, and may compact the soil toward the outside of the DLWSAP, which may advantageously provide a more secure attachment to the ground.

Figure 5C:
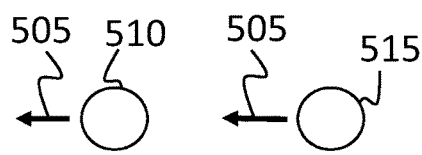

In FIG. 5C, the chamfered facets (FIG. 4B reference 410), of the anchor 510 and the body 515, face in the same direction, away from the body 515. The chamfered facets in this orientation may advantageously lower the strain on the weld of the DLWSAP, since the anchor 510 and the body 515 may move in the same direction, lateral to the installer, as the DLWSAP is inserted into the ground, and may advantageously allow the installer to make the installation of the body 515 in closer proximity to a structure.

Figure 5D:
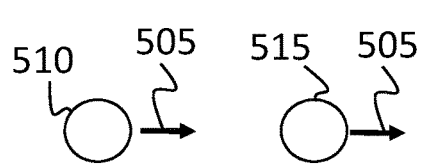

In FIG. 5D, the chamfered facets (FIG. 4B reference 410), of the anchor 510 and the body 515, face in same direction, away from the anchor 510. The chamfered facets in this orientation may advantageously lower the strain on the weld of the DLWSAP, since the anchor 510 and the body 515 may move in the same direction, lateral to the installer, as the DLWSAP is inserted into the ground, and may advantageously allow the installer to make the installation of the anchor 510 in closer proximity to a structure.

Figure 5E:
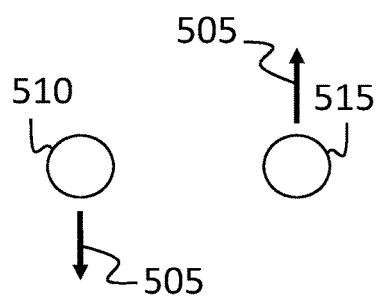

In FIG. 5E, the chamfered facets (FIG. 4B reference 410), of the anchor 510 and the body 515, face in opposite directions, normal to the plane of the anchor 510. The chamfered facets in this orientation may impart a slight rotation, for example, to the DLWSAP as it is inserted into the ground and may compact the soil in the direction of rotation, advantageously making a more secure attachment to the ground.

Figure 5F:
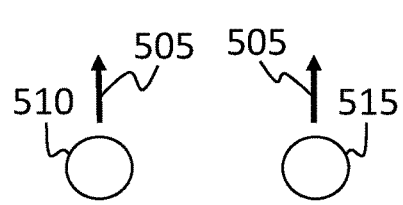

In FIG. 5F, the chamfer facets (FIG. 4B reference 410), of the anchor 510 and the body 515 face in the same direction, normal to the plane of the anchor 510. The chamfered facets in this orientation may advantageously lower the strain on the weld of the DLWSAP, since the anchor 510 and the body 515 may move in the same direction, toward or away from the installer, depending on the orientation the installer places the DLWSAP, and may advantageously help the installer balance as it moves directly toward or directly away from the installer, as the DLWSAP is inserted into the ground.

Figure 6A:
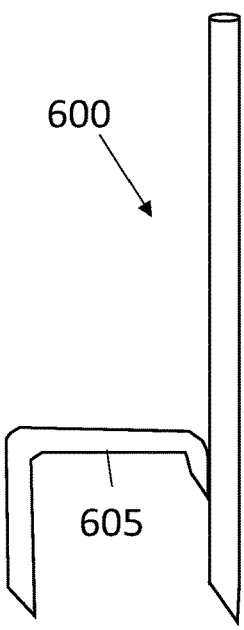
FIGS. 6A, 6B, 6C and 6D depict side elevation views of exemplary DLWSAPs illustrating various anchor member embodiments.

FIGS. 6A, 6B, 6C and 6D depict side elevation views of exemplary DLWSAPs illustrating various anchor member embodiments. In FIG. 6A, a DLWSAP 600 is attached to an anchor 605. The arm portion of the anchor 605, is substantially straight. The straight shape of the arm portion of the anchor 605 may advantageously simplify manufacture, and may reduce manufacturing costs.

Figure 6B:
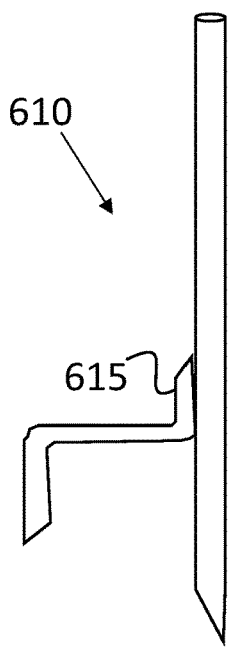

In FIG. 6B, a DLWSAP 610 is attached to an anchor 615. The head portion of the anchor 615, is bent upward instead of downward. The upward bend of the head portion of the anchor 615 may advantageously simplify manufacture by providing more welding operation clearance, and may reduce manufacturing costs.

Figure 6C:
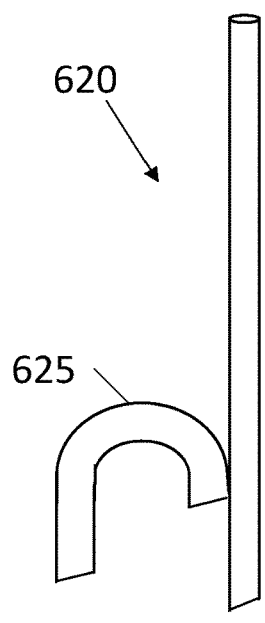

In FIG. 6C, a DLWSAP 620 is attached to an anchor 625. The arm portion of the anchor 625, is curved upward. The curved upward shape of the arm portion of the anchor 625 may advantageously simplify manufacture by requiring only one bend, and may reduce manufacturing costs. The curved upward shape of the arm portion of the anchor 625, may reduce torque on the weld, by forcing the user's downward foot force to be focused in the middle of the arm portion of the anchor 625, rather than the far end of the arm portion of the anchor 625, advantageously reducing the chance of weld failures.

Figure 6D:
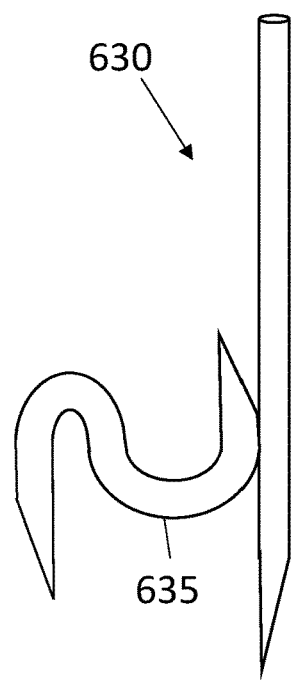

In FIG. 6D, a DLWSAP 630 is attached to an anchor 635. The arm portion of the anchor 635, is curved downward. The curved downward shape of the arm portion of the anchor 635, may advantageously conform to the natural curve of a user's footwear and may increase comfort to the user's foot. The curved downward shape of the arm portion of the anchor 635, may advantageously prevent the user's foot from sliding off the arm portion of the anchor 635, for example in rainy or muddy environments.

Figure 7:
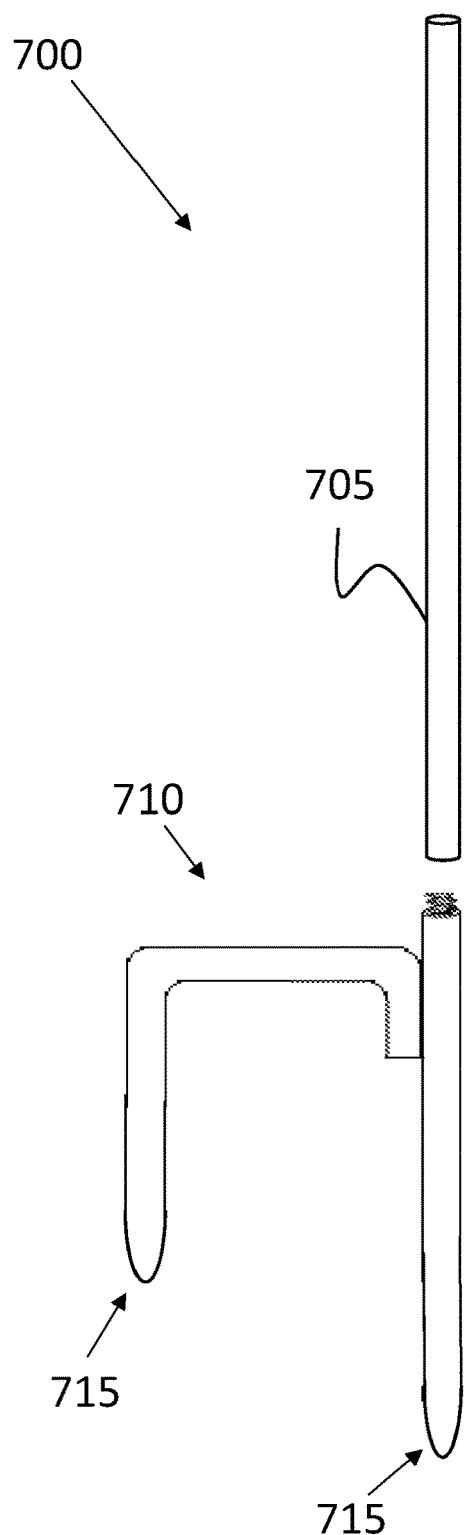
FIG. 7 depicts a side elevation view of an exemplary DLWSAP with a removable body portion.

FIG. 7 depicts a side elevation view of an exemplary DLWSAP with a removable body portion. The DLWSAP 700, as depicted, has a removeable body member 705. The removable body member 705 removably attaches to the anchor member 710. A user may benefit from the ability to leave the anchor member 710 in the ground, when DLWSAPs 700 may be required to stay in the exact place from which they were removed, for example to mark boundaries. The user may also benefit from the ability to interchange the removable body member 705 to employ alternate removable body members 705 with variable functions, without requiring removing the entire DLWSAP from the ground, for example temporarily changing a reflecting function to a fencing function, or for example temporarily changing an electric wire fence-line function to a mesh fencing function. In some embodiments, a farmer may benefit from the interchangeable removable body members 705 to repurpose a fenced-in enclosure, for example repurposing the enclosure from cattle to poultry. FIG. 7 depicts an anchor member 710 and the body member 705 each containing an ovular shaped ground penetrating end 715, advantageously providing the benefit of insertion ease without a sharp end. The lack of a sharp end may advantageously prevent damage, for example on the user's truck interior or exterior, or may advantageously prevent the user from being injured.

Figure 8A:
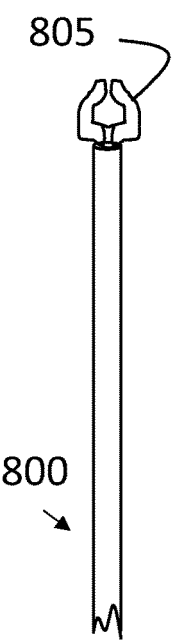
FIGS. 8A, 8B, 8C, 8D, 8E and 8F depict side elevation views of several exemplary upper post sections of DLWSAP assemblies, illustrating exemplary attachment features.

FIGS. 8A, 8B, 8C, 8D, 8E and 8F depict side elevation views of several exemplary upper post sections of DLWSAP assemblies, illustrating exemplary attachment features. In FIG. 8A, an upper post section 800 of a DLWSAP is attached to a clip feature 805. In an exemplary embodiment, the clip feature 805, may be constructed from spring metal. The clip feature 805 may be advantageously employed on a DLWSAP, and used as a sign holder for example.

Figure 8B:
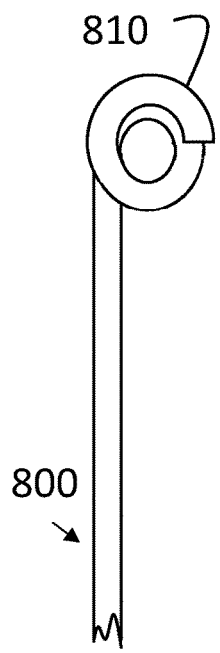

In FIG. 8B, an upper post section 800 of a DLWSAP is attached to a curl feature 810. In an exemplary embodiment, the curl feature 810, may be advantageously employed on a DLWSAP, and used as a fence wire holder for example. In an exemplary embodiment, the curl may be coated with an insulative material, advantageously allowing the curl 810 to be electrically insulated from the DLWSAP and the ground.

Figure 8C:
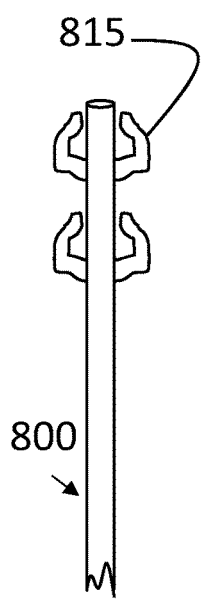

In FIG. 8C, an upper post section 800 of a DLWSAP is attached to a hangar feature 815. In an exemplary embodiment, the hangar feature 815 may be advantageously employed on a DLWSAP, and used to hold chain, for use as a temporary barrier, for example. In some embodiments, the hangar feature may be used to hang mesh fencing, for example to contain fowl.

Figure 8D:
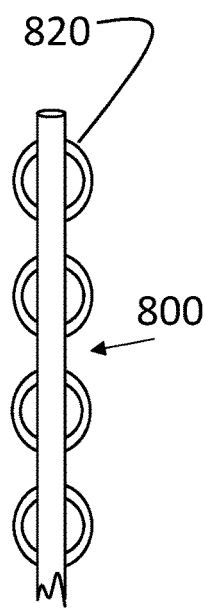

In FIG. 8D, an upper post section 800 of a DLWSAP is attached to several loop features 820. In an exemplary embodiment, wire mesh fencing may be hung on the loop features to provide a temporary pen structure for poultry. In some embodiments, the loop features 820 may be advantageously employed on a DLWSAP, and used as a stanchion, to hold sections of rope with end hooks, for use as a temporary rope-line for crowd management, for example.

Figure 8E:
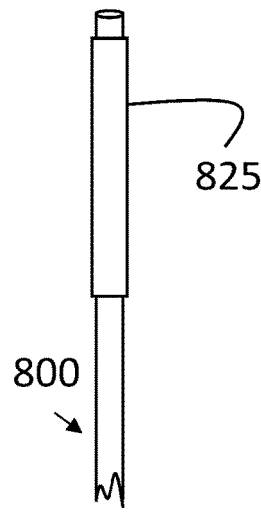

In FIG. 8E, an upper post section 800 of a DLWSAP is attached to a reflective tape 825. In some embodiments, the reflective tape 825 may be advantageously employed on a DLWSAP, and used as an attention-grabbing hazard marker, for use as a trail marker, for recreational vehicle drivers, in low light environments, for example.

Figure 8F:
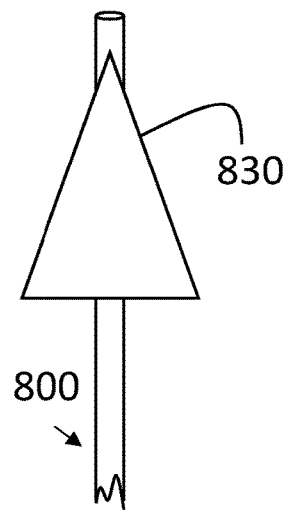

In FIG. 8F, an upper post section 800 of a DLWSAP is attached to a reflector 830. In some embodiments, the reflector 830 may be advantageously employed on a DLWSAP, and used as a driveway marker, for example.

Although various embodiments have been described with reference to the figures, other embodiments are possible. For example, in some embodiments portions of the apparatus may be rubber coated, advantageously providing hand abrasion protection, or providing safety insulation from electric fencing, for example. In some embodiments, the DLWSAP may be powder-coated. Power-coating orange may provide a high visibility benefit, for example. Power-coating green may provide a camouflage benefit, for example.

In an exemplary embodiment, a rancher may benefit from quicker installation due to quicker ground penetration, due to the chamfered facets.

In an exemplary embodiment, a gardener may benefit from easier insertion of the DLWSAP due to the chamfered facets.

In an exemplary embodiment, construction crews may benefit from the chamfered facets when working in packed-down soils, for example. Construction crews may also benefit from the double weld attachment due to rough handling or due to construction equipment rolling over the DLWSAPs, for example.

In an exemplary embodiment, persons maintaining recreational trails may benefit from the double weld attachment due to vehicles rolling over the DLWSAPs, for example. Recreational riders may find benefit from the reflective safety tape or safety signs attached to the DLWSAPs. In an exemplary scenario, a snowmobiler driving at a high rate of speed at night may catch a glimpse of a reflector on a DLWSAP, and may cause the driver to slow down and avoid injury from the marked hazard.

In an exemplary embodiment, property-owners may benefit from the reflective features at the end of the DLWSAPs, to mark sidewalks, landscaping or driveways, for example.

In an exemplary embodiment, the separate body and anchor members may be combined into a unitary structure, for example a unitary molded structure, to provide a manufacturing cost benefit, for example. In an exemplary embodiment, the DLWSAP may be made of plastic, advantageously providing corrosion resistance, providing bendability reducing costs and reducing weight. In an exemplary embodiment, the DLWSAP may be made of fiberglass, advantageously providing corrosion resistance and reducing weight. In an exemplary embodiment, the DLWSAP may be made of carbon fiber, advantageously providing a strong yet lightweight material option.

In an exemplary embodiment, the two-piece embodiment of FIG. 7, may be releasably coupled, for example screwed together.

In some embodiments, the chamfered ends of the post may be shipped with a protective cap, to protect shipping personnel, store shelf stockers or to protect the end user before the post is deployed.

In some embodiments, the DLWSAP may contain 2 or more anchor members, advantageously providing the ability to insert the post with both feet. In some instances, more than one anchor member may provide additional lateral support, for instance in high winds or in environments where the post may encounter collisions with vehicles or people, such as on a ski slope. In an exemplary embodiment, the body portion may be supported by 4 anchor members, extending orthogonally from the body, located substantially 90° from one another, providing support from wind in any direction, for example.

In an exemplary embodiment, the head anchor portion may have a chamfered facet, advantageously reducing manufacturing time due to only one cut needed for all anchors. In this embodiment, the material for the anchor may be cut to the desired length, and since each cut may be the end of one anchor and the start of the next anchor, cutting all at a same angle may save manufacturing steps and material.

In an exemplary embodiment, the DLWSAP may be made of steel, advantageously providing a very strong low cost material option. In an exemplary embodiment, the DLWSAP may be made of aluminum, advantageously reducing weight and providing corrosion resistance. In some embodiments, the DLWSAP may be coated with a corrosion resistant material, advantageously providing rust resistance, for example.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. An apparatus comprising:
   a two-segmented shaft body member extending along a longitudinal axis further comprising a first ground penetrating chamfer measured at a first angle with respect to the longitudinal axis; and,
   a unitary shaft anchor member comprising;
   a first bend forming:
   a first distal end parallel to, and contacting the body member;
   a mid-portion step member extending substantially orthogonal to the body member; and
   a second bend forming a second distal end extending substantially parallel to, and separated from the body member, the second distal end terminating with a second ground penetrating chamfer measured at a second angle with respect to the longitudinal axis,
wherein the two-segmented shaft body is removably joined,
wherein the two-segmented shaft body member is weldably attached to the anchor member,
the weld further comprising two separate weld fillets connecting the body and the anchor,
the weld fillets located on each side of the mating line between the body member and the anchor member.

2. The apparatus of claim 1, wherein the first angle is substantially equal to the second angle.

3. The apparatus of claim 1, wherein the unitary shaft body member is substantially cylindrical with a diameter substantially equal to 5/16 inches, wherein the unitary shaft anchor member is substantially cylindrical with a diameter substantially equal to 3/8 inches.

4. The apparatus of claim 3, further comprising a flattened feature on the mid-portion step member.

5. The apparatus of claim 3, wherein the mid-portion step member is curved upward.

6. The apparatus of claim 3, wherein the chamfer is substantially bullet shaped.

7. The apparatus of claim 1, further comprising a flattened feature on the mid-portion step member.

8. The apparatus of claim 1, wherein the mid-portion step member is curved downward.

9. The apparatus of claim 1, wherein the mid-portion step member is curved upward.

10. An apparatus comprising:
a unitary shaft body member extending along a longitudinal axis further comprising a first ground penetrating chamfer measured at a first angle with respect to the longitudinal axis; and,
a unitary shaft anchor member comprising:
a first bend forming:
a first distal end parallel to, and contacting the body member;
a mid-portion step member extending substantially orthogonal to the body member; and,
a second bend forming a second distal end extending substantially parallel to, and separated from the body member, the second distal end terminating with a second ground penetrating chamfer measured at a second angle with respect to the longitudinal axis,
wherein the body member is weldably attached to the anchor member, the weld further comprising two separate weld fillets connecting the body and the anchor, the weld fillets located on each side of the mating line between the body member and the anchor member.

11. The apparatus of claim 10, wherein the unitary shaft body member is substantially cylindrical with a diameter of about 5/16 inches, and the unitary shaft anchor member is substantially cylindrical with a diameter of about 3/8 inches.

12. The apparatus of claim 10, further comprising a reflective feature on the body member.

13. The apparatus of claim 10, further comprising a flattened feature on the mid-portion step member.

14. The apparatus of claim 10, wherein the mid-portion step member is curved downward.

15. The apparatus of claim 10, wherein the mid-portion step member is curved upward.

16. The apparatus of claim 11, further comprising a flattened feature on the mid-portion step member.

17. The apparatus of claim 11, wherein the mid-portion step member is curved downward.

18. The apparatus of claim 11, wherein the mid-portion step member is curved upward.

19. The apparatus of claim 11, wherein the chamfer is substantially bullet shaped.

20. The apparatus of claim 11, further comprising a reflective feature on the body member.

\* \* \* \* \*